United States Patent [19]
Mealey et al.

[11] Patent Number: 5,545,700
[45] Date of Patent: Aug. 13, 1996

[54] MOISTURE-CURABLE SILICONE PRESSURE SENSITIVE ADHESIVES

[75] Inventors: Shawn K. Mealey; Randall G. Schmidt, both of Midland; William P. Brady, Sanford, all of Mich.

[73] Assignee: Dow Corning Corporation, Midland, Mich.

[21] Appl. No.: 179,417

[22] Filed: Jan. 10, 1994

[51] Int. Cl.$^6$ .............................. C08L 83/05; C08L 83/07
[52] U.S. Cl. ........................................... 525/478; 525/477
[58] Field of Search ...................... 525/478, 477

[56] References Cited

U.S. PATENT DOCUMENTS

| | | | |
|---|---|---|---|
| 2,676,182 | 9/1950 | Daudt et al. | 260/448.2 |
| 4,287,114 | 9/1981 | Itoh et al. | 525/479 |
| 4,329,273 | 5/1982 | Hardman et al. | 524/862 |
| 4,584,355 | 4/1986 | Blizzard et al. | 525/477 |
| 4,585,836 | 4/1986 | Homan et al. | 525/477 |
| 4,591,622 | 5/1986 | Blizzard et al. | 525/477 |
| 4,754,013 | 6/1988 | Antonen | 528/15 |
| 4,774,297 | 9/1988 | Murakami et al. | 525/478 |
| 4,831,070 | 5/1989 | McInally et al. | 524/267 |
| 4,988,779 | 1/1991 | Medford et al. | 525/478 |
| 5,034,061 | 7/1991 | Maguire et al. | 106/287.14 |
| 5,169,727 | 12/1992 | Boardman | 428/447 |
| 5,248,739 | 9/1993 | Schmidt et al. | 525/477 |
| 5,254,644 | 10/1993 | Kobori et al. | 528/478 |

FOREIGN PATENT DOCUMENTS

| | | | |
|---|---|---|---|
| 0269454 | 11/1987 | European Pat. Off. | |
| 0269454A2 | 11/1987 | European Pat. Off. | C09J 3/16 |

*Primary Examiner*—Margaret Glass
*Attorney, Agent, or Firm*—Sharon K. Severance

[57] ABSTRACT

Silicone pressure sensitive adhesive compositions which cure in the presence of moisture comprise an adhesive component which bears alkoxy radical-containing curing radicals and, optionally, a catalyst to accelerate the reaction of moisture with the alkoxy radicals to form siloxane bonds. Curing provides adhesives ranging from pressure sensitive adhesives having improved properties to permanent adhesives. The adhesives are useful for adhering an object to a surface and thereafter improving the bond between the object and the surface by exposure to moisture.

14 Claims, No Drawings

MOISTURE-CURABLE SILICONE PRESSURE SENSITIVE ADHESIVES

BACKGROUND OF THE INVENTION

The present invention relates to silicone pressure sensitive adhesives compositions, hereinafter also referred to as SPSAs, which cure by the action of ambient moisture, and to a method for their preparation. In a preferred embodiment the present invention relates to SPSA compositions which cure to a permanent adhesive which are useful as a structural adhesive.

By the term "silicone pressure sensitive adhesive" it is meant an adhesive comprising one or more siloxane components and possessing sufficient tack and cohesive strength so that it can be adhered with mild pressure to a clean stainless steel substrate and then removed therefrom and adhered to the same or another clean substrate. By the term "permanent adhesive" it is meant an adhesive that bonds to a clean substrate and cannot be so removed and thereafter re-adhered.

At the present time all commercial SPSA compositions are designed for the relatively low strength bonding of surfaces, such as electrical insulating tapes, medical tapes and devices and high temperature masking tapes. These commercial SPSA compositions are also designed to possess their ultimate adhesive properties when first applied.

However, there is a need for a SPSA which will provide higher bonding strengths and/or which will develop additional adhesive properties, such as resistance to flow or long term durability, after being applied.

Silicone structural glazing of curtainwall panels represents one of those needs. Durable structural glazing is currently done with silicone sealants in a multi-step, labor-intensive, time-consuming process. Significant improvements in the structural glazing process could be realized if a SPSA were used in place of the silicone sealant in the current process.

Unfortunately, standard SPSAs are not completely suitable for structural glazing applications because of their inherent flowability, albeit slow in the recently improved SPSAs, under sustained stress. Under the sustained stress of gravity the heavy glass panel that is currently used in structural glazing, if supported only by pressure sensitive adhesive, would eventually experience shear failure of the bond. A SPSA that cures to a non-shearing adhesive having high adhesive strength would be very beneficial in this and other applications.

In copending U.S. patent application Ser. No. 08/063,105, now U.S. Pat. No. 5,470,923 to Krahnke et al., commonly owned, the applicant's set forth a moisture-curable silicone pressure sensitive adhesive comprising (1) a mixture of a silicone resin and polydiorganosiloxane gum wherein the resin and/or gum bears alkoxy or alkoxyalkyl radicals or (2) a bodied product of the resin/gum wherein the bodied product bears alkoxy or alkoxyalkyl radicals. The compositions of Krahnke et al. are produced by reacting a silicone pressure sensitive adhesive composition comprising a resin/ gum or bodied product wherein the resin, gum or bodied product has reactive alkenyl, hydroxyl, or hydrogen atoms with a moisture-reactive compound which is capable of reacting with the alkenyl, hydroxyl or hydrogen atoms in the SPSA. The compositions of Krahnke et al. initially exhibit properties of a pressure sensitive adhesive however, upon exposure to moisture they cure to a permanent adhesive.

It is an object of this invention to show another composition for obtaining moisture-curable silicone pressure sensitive adhesives which become a permanent adhesive in the presence of ambient moisture and which are suitable for structural glazing applications.

BRIEF SUMMARY OF THE INVENTION

The instant invention pertains to a silicone pressure sensitive adhesive comprising (A) a capped silicone resin, (B) an alkenyl functional polydiorganosiloxane polymer, (C) a organohydrogenpolysiloxane compound, (D) an alkenetrialkoxysilane (E) a platinum containing catalyst and (F) a moisture-curing catalyst. The SPSA composition of the instant invention is applied to the desired substrate and thermal cured. Following the initial thermal cure the adhesive exhibits normal levels of strength and adhesion that are typical to silicone pressure sensitive adhesives. Upon subsequent exposure to moisture the adhesive cures to an elastomeric like substance, preferably a permanent adhesive, while increasing its adhesive strength.

The compositions of this invention are useful for adhering an object to a substrate without the need for means to hold the object in place while the adhesive cures.

DETAILED DESCRIPTION OF THE INVENTION

The instant invention pertains to a silicone pressure sensitive adhesive comprising (A) a capped organopolysiloxane resin, (B) an alkenyl functional polydiorganosiloxane polymer, (C) a organohydrogenpolysiloxane compound, (D) an alkenetrialkoxysilane (E) a platinum containing catalyst and (F) a moisture-curing catalyst.

Component (A) of the present invention is a capped organopolysiloxane resin that consists essentially of $R_3SiO_{1/2}$ siloxane units and $SiO_{4/2}$ siloxane units and can be dissolved, substantially completely, in either a hydrocarbon liquid such as benzene, toluene, xylene, heptane and the like or in a silicone liquid such as a low viscosity cyclic or linear polydiorganosiloxanes. The capped organopolysiloxane resins (A) of the instant invention contain no more than 1 weight percent silicon-bonded hydroxyl groups based on the total weight of (A), and preferably contains no more than 0.6 weight percent.

In the $R_3SiO_{1/2}$ siloxane units each R individually is a monovalent hydrocarbon radical having less than 18 carbon atoms, preferably having from 1 to 10 carbon atoms. Examples of suitable hydrocarbon R radicals include alkyl radicals, such as methyl, ethyl, propyl, pentyl, octyl, undecyl and octadecyl; alkenyl radicals, such as vinyl, allyl and 5-hexenyl; cycloaliphatic radicals, such as cyclohexyl and cyclohexenylethyl; and aryl radicals such as phenyl, tolyl, xylyl, benzyl and 2-phenylethyl.

At least one-third, and more preferably substantially all R radical, in the formula for component (1) are methyl radicals. Examples of preferred $R_3SiO_{1/2}$ siloxane units include $Me_3SiO_{1/2}$, and $PhMe_2SiO_{1/2}$.

The mole ratio of the $R_3SiO_{1/2}$ siloxane units to $SiO_{4/2}$ siloxane units of component (1) has a value of from 0.5/1 to 1.5/1, preferably from 0.6/1 to 1.0/1. Resins having ratio of $R_3SiO_{1/2}$ units to every $SiO_{4/2}$ units from 1.1 to 1.5 are also useful in the instant invention. These mole ratios are easily measured by Si29 n.m.r. spectroscopy.

Methods for producing capped organopolysiloxane resins are well known in the art. The capped organopolysiloxane resin (A) may be prepared by first preparing an untreated resin copolymer according to Daudt, et al., U.S. Pat. No. 2,676,182, and, thereafter, treating an organic Solvent solution of the untreated resin copolymer with a suitable endblocking agent to reduce the amount of silicon-bonded hydroxyl units to reduce the amount of silicon-bonded hydroxyl units to less than about 1 weight percent, preferably less than 0.5 wt %. Endblocking agents capable of providing endblocking triorganosilyl units are commonly employed as silylating agents and a wide variety of agents are known and disclosed in U.S. Pat. No. 4,584,355 and 4,591,622 to Blizzard, et al., and U.S. Pat. No. 4,585,836 to Homan, et al. which are hereby incorporated by reference. A single endblocking agent such as hexamethyldisilazane can be used or a mixture of such agents can be used. A number of methods are known in the art for determining silicon-bonded hydroxyl content. The procedure for treating the resin copolymer may be simply to mix the endblocking agent with a solvent solution of the resin copolymer and allowing the by-products to be removed. Preferably, an acid catalyst is added and the mixture is heated to reflux conditions for a few hours.

Component (B) is an alkenyl functional polydiorganosiloxane polymer having the general formula $R^1_2R^2SiO(R^2_2SiO)_nSiR^2R^1_2$ wherein each $R^1$ individually is a radical selected from the group consisting of methyl, ethyl, propyl and phenyl, each $R^2$ individually is selected from the group consisting of an alkenyl radical and $R^1$, as defined above, with the proviso that at least two $R^2$ radicals per molecule must be alkenyl; and n has a value such that the viscosity of (B) is from 10,000 centipoise to 10,000,000 centipoise at 25° C., preferably from 100,000 to 10,000,000 centipoise, more preferably from 1,000,000 to 10,000,000 centipoise. Preferably at least 50%, and more preferably 90%, of all $R^1$ groups should be methyl. $R^2$ may be exemplified by, but not limited to, vinyl, allyl, butenyl, hexenyl and others. Component (B) may be comprised of a single polydiorganosiloxane, a mixture of two or more polydiorganosiloxanes that meet the above formula, or a mixture of polydiorganosiloxanes wherein at least one meets the above formula for component (B).

The alkenyl functional polydiorganosiloxane polymer (B) may be exemplified by, but not limited to, $ViMe_2SiO(Me_2SiO)_nSiMe_2Vi$, $ViMe_2SiO(Me_2SiO)_{0.95n}(MePhSiO)_{0.05n}SiMe_2Vi$, $ViMe_2SiO(Me_2SiO)_{0.98n}(MeViSiO)_{0.02n}SiMe_2Vi$, $Me_3SiO(Me_2SiO)_{0.95n}(MeViSiO)_{0.05n}SiMe_3$, $PhMeViSiO(Me_2SiO)_nSiPhMeVi$, and others where Me, Vi, and Ph denote methyl, vinyl and phenyl respectively and n has its previously defined meaning.

The relative amounts of components (A) and (B) that are present in the compositions of this invention range from 10 to 80 parts by weight of component (B) for every 100 parts by weight of components (A) and (B). Preferably the silicone pressure sensitive adhesives contain 20 to 50 parts by weight of component (B) for every 100 parts by weight of (A) and (B).

Component (C) of the present invention is an organohydrogenpolysiloxane compound having an average of at least 3 silicon-bonded hydrogen atoms per molecule. The amount of (C) present in the adhesive composition is sufficient to provide from 1 to 30 silicon bonded hydrogen atoms for every olefinically unsaturated radical in the total of (A) plus (B). Preferably there are from 1 to 10 silicon bonded hydrogen atoms for every olefinically unsaturated radical.

In order to be effective for this invention, component (C) must be compatible with, and preferably soluble in, the mixture of (A) and (B). By compatible, it is meant that the required amount of organopolysiloxane (C) is at least partially soluble in the mixture of (A) and (B) and will exist in a uniformly dispersed state in the compositions of this invention while participating in the thermal curing reaction, until the cure has been effected.

Illustrative of component (C) useful in the instant invention are fluid organohydrogenpolysiloxanes such as methylhydrogenpolysiloxanes, linear methylhydrogenpolysiloxanes, branched methylhydrogenpolysiloxanes, dimethylmethylhydrogenpolysiloxane copolymers, fluid siloxane copolymers, resins comprised of $SiO_{4/2}$ units, $Me_3SiO_{1/2}$ units and units of $Me_2HSiO_{1/2}$, $MeHSiO_{2/2}$ and $Me_2SiO_{2/2}$, etc.; and mixtures thereof.

Component (D) is an alkenetrialkoxysilane represented by the general formula $R^3Si(OR^4)_3$ wherein $R^3$ is an alkenyl group and $R^4$ is an alkyl group having from 1 to 4 carbon atoms. $R^3$ may be exemplified by, but not limited to, vinyl, allyl, butenyl, hexenyl and others. $R^4$ may be exemplified by, but not limited to, methyl, ethyl, propyl, butyl and others. The alkenetrialkoxysilanes useful in the instant invention may be exemplified by, but not limited to, vinyltrimethoxysilane, vinyltriethoxysilane, allyltrimethoxysilane, allyltriethoxysilane and others.

Component (D) is present in an amount of 0.5 to 10 parts per 100 parts of (A) and (B), preferably from 0.75 to 5 parts per 100 parts of (A) and (B).

Component (E) is a platinum containing catalyst. Component (E) may be any of the well known forms of platinum that are effective for catalyzing the reaction of silicon bonded hydrogen atoms with silicon bonded vinyl groups. Useful platinum containing catalysts include, but are not limited to, platinum hydrocarbon complexes, platinum alcoholate catalysts and platinum chloride-olefin complexes, which are thermally activated.

The platinum containing catalyst is present in an amount sufficient to provide at least 0.1 to 1,000; preferably 1 to 500; most preferably 10 to 300 parts by weight of platinum for every one million parts by weight of the combined weight of (A) through (D).

Component (F) is a moisture curing catalyst that is included to promote the moisture-initiated reaction of the alkoxy radicals to form siloxane bonds. Catalyst (F) can be any catalyst known in the art capable of promoting the moisture-initiated reaction of the alkoxy radicals. Such catalyst include, but are not limited to, tin IV salts of carboxylic acids, such as dibutyltin dilaurate, and organotitanium compounds such as tetrabutyl titanate and partially chelated derivatives of these salts with chelating agents such as acetoacetic acid esters and betadiketones. Component (F) is present in an amount suitable to promote the moisture-initiated reaction of the alkoxy radicals of (D). Typically component (F) is present from 0.5 to 10 weight percent based on the amount of (A) and (B). Preferably, component (F) is employed at about 1 weight percent based on the amount of (A) and (B).

The components of the compositions of this invention can be mixed in any manner such as in bulk or in organic solvent. Since the resin, component (A) is conveniently prepared and handled in an organic solvent, the preparation of the compositions of this invention preferably employs an organic solvent, at least for the mixing of (A) and (B). The organic solvent can be any of the solvents conventionally used with organosiloxanes such as toluene, xylene, and heptane.

Mixing of the components can be accomplished by any of the techniques that are known in the polymer art such as milling, blending, stirring, and others either in batch or in continuous process. The compositions of this invention are obtained whenever the components (A) through (F) are mixed together in the stated proportions. When producing the compositions of the instant invention it is preferred that the platinum catalyst (E) or organohydrogenpolysiloxane (C) is added last.

The preferred method of preparing the compositions of this invention is to mix the capped organopolysiloxane resin (A) which may be dissolved in an organic solvent, with the alkenyl functional polydiorganosiloxane polymer (B). Typically the capped organopolysiloxane resin (A) is dissolved in about five to fifty weight percent of an organic solvent to facilitate mixing. The organohydrogenpolysiloxane (C), alkenetrialkoxysilane (D), platinum catalyst (E) and moisture curing catalyst (F) are added to the mixture of (A) and (B) to complete the composition and curing of the composition will begin.

Small amounts of additional ingredients may be added to the compositions of this invention. For example, antioxidants, pigments, stabilizers, fillers, etc., may be added as long as they do not materially reduce the pressure sensitive adhesive properties of these compositions.

When components (A) through (F) are mixed, the composition begins to cure at a rate which is proportional to the temperature of the composition. The compositions of this invention can be cured at room temperature or cured by heating. When heat curing is employed, a temperature from about 70° C. to 200° C., preferably 100° C. to 150° C., is employed, whereupon curing proceeds in about fifteen minutes, typically in about 5 minutes, or less. If curing is carried out at too high a temperature, or for too long a period, a loss of the desired tack and peel may occur. Simple experimentation may be required to determine the optimum cure time and temperature for a particular formulation.

A platinum catalyst inhibitor (G) can be added to the mixture to delay the cure of the composition at room temperature. Platinum catalyst inhibitors which are useful in the compositions of this invention and which display varying lengths of cure time inhibition include any platinum-catalyst inhibitor that is known in the art. Preferred platinum catalyst inhibitors include eneynes, such as 3-methyl-3-pentene-1-yne and 3,5-dimethyl-3-hexene-1-yne; acetylenic alcohols, such as 3-methyl-1-butyne-3-ol, 3,5-dimethyl-1-hexyne-3-ol, 3-methyl-1-pentyne-3-ol, and phenylbutynol; maleates and fumarates, such as the well-known dialkyl, dialkenyl and dialkoxyalkyl fumarates and bis(methoxymethyl)ethyl maleate; or cyclovinylsiloxanes.

The effectiveness of a platinum catalyst inhibitor depends on many factors such as its chemical composition, its physical properties, its concentration, etc. Since many platinum catalyst inhibitors are relatively volatile it is preferable to add them to the compositions of this invention after any heating and/or vacuum operations have been completed. For maximum effectiveness, however, a platinum catalyst inhibitor should be added to the compositions of this invention at least simultaneously with, and preferably prior to mixing of the organohydrogenpolysiloxane (C), and the platinum catalyst (E). The platinum catalyst inhibitor can be used in any amount that will retard the above-described catalyzed addition reaction at room temperature while not preventing said reaction at elevated temperature.

The compositions of this invention can be used in all of the applications to which the SPSA compositions of the art are directed since they possess adhesive properties after the initial thermal cure, one or more of which properties will improve upon exposure to ambient moisture. Additionally, the compositions of this invention can be used in all of the applications to which the permanent adhesive compositions of the art are directed since certain embodiments thereof will cure to the permanent adhesive state upon exposure to ambient moisture. It is expected that the compositions of this invention will satisfy other adhesive needs in view of their moisture-activated curing capability.

Typically, the use of the compositions of this invention comprises applying a composition of this invention to a substrate; removing substantially all of the solvent from the applied composition; thermally curing the composition as described above to provide an adhesive-bearing substrate; and adhering the adhesive-bearing substrate to a surface. Optionally, one can expose the adhesive on the adhered substrate to moisture to improve one or more adhesive properties selected from peel adhesion, tensile adhesion, adhesive failure mode, yield modulus, modulus at cohesive failure, and others.

It is recommended that the adhesive-bearing substrate be applied to the surface within a few days to a few weeks after being prepared. If there is any delay in applying the adhesive-bearing substrate to the surface it is recommended to maintain the adhesive under substantially anhydrous conditions.

The substrate and surface to which the SPSA compositions of the instant invention can be applied can have any solid form and can comprise any material. Examples of suitable forms include decorative articles, devices and mechanical parts in elastomer, foam, flexible or rigid consistency. Examples of suitable materials include ferrous and non-ferrous metals, such as aluminum, iron, copper, tin, silver, gold, platinum and their several alloys; synthetic polymeric materials, such as polyolefins, polyesters, polyamides, polyacrylates, polyfluoroolefins and polysiloxanes; cellulosic materials, such as paper and wood; textile materials, such as cotton and its blends; and siliceous materials, such as glass, cement, concrete, brick, ceramic, porcelain, china, quartz and crystal.

So that those skilled in the art can understand and appreciate the invention taught herein, the following examples are presented, it being understood that these examples should not be used to limit the scope of this invention found in the claims attached hereto. Unless stated otherwise, all ratios, parts and percentages are by weight and temperatures are in degrees Celsius.

Measurement of Peel Adhesion and Tack

Unless otherwise stated, a 50% solution of SPSA composition was cast onto 2-mil Mylar(R), drawn down with a 3 mil bird bar (Gardner Pacific) and the film was heated at 130° C. for 4 minutes to thermal cure to a SPSA and provide a dry adhesive thickness of 1.5 mils.

Peel adhesion (Adh) of a SPSA was measured by applying a 6"×1" strip of the Mylar-backed adhesive to a clean 2"×6" stainless steel panel using two passes of a 2 kg rubber-coated roller. The force required to remove the tape therefrom was measured with a Keil Tester at a peel angle of 180° at a rate of 12 inches/minute. The values recorded are the average of multiple readings taken during the course of one pull per sample.

MATERIALS:

Resin A: is a 37% xylene solution of a siloxane resin copolymer consisting essentially of $(CH_3)_3SiO_{1/2}$ units and $SiO_2$ units in a molar ratio of approximately 0.65:1 and having a hydroxyl content of less than 0.25 wt %.

Resin B: is a 30% xylene solution of a siloxane resin copolymer consisting essentially of $(CH_3)_3SiO_{1/2}$ units and SiO$_2$ units in a molar ratio of approximately 1:1 and having a hydroxyl content of approximately 1.25 wt %.

Resin C: is a 24% xylene solution of a siloxane resin copolymer consisting essentially of (CH$_3$)$_3$SiO$_{1/2}$ units and SiO$_2$ units in a molar ratio of approximately 1:1 and having a hydroxyl content of approximately less than 0.25 wt %.

Fluid 1: is a dimethylvinylsiloxy-terminated polydimethylsiloxane gum containing 0.142 mole percent of methylvinylsiloxane units and exhibiting a plasticity of from 60 mils based on ASTM D926.

Fluid 2: is a dimethylvinylsiloxy-terminated polydimethylsiloxane gum exhibiting a plasticity number of about 60 mils based on ASTM D926.

Fluid 3: is a liquid dimethylvinylsiloxy terminated polydimethylsiloxane having a viscosity of about 55 Pa.s at 25° C.

SiH Polysiloxane: is a dimethyl, methylhydrogen polysiloxane having a viscosity of about 30 cSt at 25° C. and containing about 1 wt % SiH.

Pt Catalyst: is chloroplatinic acid complex of divinyltetramethyldisiloxane diluted with dimethylvinylsiloxy endblocked polydimethylsiloxane to provide 0.65 weight percent platinum.

Pt Inhibitor: is 3,5 dimethyl-3-hexene-1-yne.

EXAMPLE 1

Adhesives 1A–F were prepared by combining Resin A, either Fluid 1 or Fluid 2, vinyltrimethoxysilane, platinum catalyst, platinum inhibitor and xylene in the proportions in Table 1. To this mixture was added the SiH polysiloxane in the proportions shown in Table 1 and 0.85 grams n-butyl titanate. The samples were then coated on Mylar and cured as set forth above. The adhesion results are given in Table 1.

TABLE 1

| Samples | A | B | C | D | E | F |
|---|---|---|---|---|---|---|
| Resin A (grams) | 38.8 | 38.8 | 38.8 | 38.8 | 38.8 | 38.8 |
| Fluid 1 (grams) | 0 | 0 | 0 | 20 | 20 | 20 |
| Fluid 2 (grams) | 20 | 20 | 20 | 0 | 0 | 0 |
| Vi(OMe)$_3$ (grams) | 0.75 | 0.75 | 0.75 | 0.75 | 0.75 | 0.75 |
| SiH Polysiloxane (grams) | 0.55 | 0.85 | 2.2 | 0.55 | 0.85 | 2.2 |
| Pt Catalyst (grams) | 0.15 | 0.15 | 0.15 | 0.15 | 0.15 | 0.15 |
| Pt Inhibitor (grams) | 0.014 | 0.014 | 0.014 | 0.014 | 0.014 | 0.014 |
| Xylene (grams) | 25 | 25 | 25 | 25 | 25 | 25 |
| n-Butyl Titanate (grams) | 0.85 | 0.85 | 0.85 | 0.85 | 0.85 | 0.85 |
| Initial Adhesion (oz/in) | 32 | 36 | 40 | 36 | 42 | 35 |
| Cured Adhesion |  |  |  |  |  |  |
| oz/in | 112 | 130 | 128 | 64 | 76 | 96 |
| days cured | 49 | 48 | 48 | 45 | 45 | 45 |

EXAMPLE 2

A stock solution was prepared by mixing together 128 grams of Resin A, 66 grams of Fluid 2, 99 grams of xylene, 0.5 grams of platinum catalyst, and 0.042 grams of Pt inhibitor. This mixture was stirred overnight. To portions of the stock solution, ViSi(OMe)$_3$, SiH polysiloxane and n-Butyl Titanate were added according to Table 2. The resulting compositions were cast at 3 mil wet coat onto 2 mil Mylar and tested for adhesion. Samples B and C adhered to the liner with C being the worst. Adhesion are in Table 2.

TABLE 2

| Samples | A | B | C |
|---|---|---|---|
| Stock Solution (grams) | 15.7 | 22.5 | 20.3 |
| Vi(OMe)$_3$ (grams) | 0.13 | 0.315 | 0.41 |
| SiH Polysiloxane (grams) | 0.37 | 0.9 | 1.13 |
| n-Butyl Titanate (grams) | 0.15 | 0.22 | 0.20 |
| Initial Adhesion (oz/in) | 30 | 7 | — |
| Cured Adhesion |  |  |  |
| oz/in | 104 | 88 | — |
| days cured | 8 | 8 | — |

EXAMPLE 3

Two samples were prepared using the amounts and components according to Table 3 and coated at a 3 mil wet coat onto 2 mil Mylar. Adhesion results are given in Table 3.

TABLE 3

| Samples | A | B |
|---|---|---|
| Resin B (grams) | 51.3 | 0 |
| Resin C (grams) | 0 | 49.6 |
| Fluid 2 (grams) | 10 | 10 |
| Vi(OMe)$_3$ (grams) | 0.37 | 0.37 |
| SiH Polysiloxane (wt %) | 0.87 | 0.87 |
| Pt Catalyst (grams) | 0.12 | 0.12 |
| Pt Inhibitor (grams) | 0.014 | 0.014 |
| Xylene (grams) | 24.4 | 23.8 |
| n-Butyl Titanate (wt %) | 1 | 1 |
| Cured Adhesion |  |  |
| oz/in | 96* | 96* |
| days cured | 28 | 28 |

EXAMPLE 4

A mixture was prepared by mixing together 38.8 grams of Resin A, 20 grams of Fluid 3, 0.75 grams of ViSi (OMe)$_3$ and 0.85 grams of SiH polysiloxane. To 15 grams of this mixture was added 0.045 grams of platinum catalyst, 0.007 grams of platinum inhibitor and 0.15 grams of n-Butyl titanate. This composition was coated at a 3 mil wet coat (35A) and 6 mil wet coat (35B) on 2 mil Mylar and tested for adhesion. Results are given in Table 4.

TABLE 4

| Samples | A | B |
|---|---|---|
| Initial Adhesion (oz/in) | 24 | 34 |
| Cured Adhesion |  |  |
| oz/in | 78 | 98 |
| days cured | 14 | 14 |

EXAMPLE 5

A mixture was prepared by mixing together 50 grams of Resin C, 13 grams of Fluid 3, 0.5 grams of vinyl trimethoxysilane, 1.6 grams of SiH polysiloxane, and 0.66 grams of diethylfumarate (platinum inhibitor) and 0.65 grams of n-tetrabutyl titanate. To approximately 6 grams of this mixture there was added 0.015 grams of platinum catalyst. This composition was cast at 3 mil wet coat onto 2 mil Mylar and tested for adhesion. The initial adhesion was 60 oz/in. After 7 days the adhesion was 80+oz/in.

EXAMPLE 6

Three samples were prepared using the amounts and components according to Table 6 and coated at a 3 mil wet coat onto 2 mil Mylar. Adhesion results are given in Table 6.

TABLE 6

| Samples | A | B | C |
| --- | --- | --- | --- |
| Resin C (grams) | 50 | 50 | 50 |
| Fluid 3 (grams) | 13 | 13 | 13 |
| Vi(OMe)$_3$ (grams) | 0.75 | 1.0 | 1.25 |
| SiH Polysiloxane (wt %) | 2.2 | 2.2 | 2.2 |
| Pt Catalyst (grams) | 0.03 | 0.03 | 0.03 |
| Pt Inhibitor (grams) | 0.028 | 0.028 | 0.028 |
| n-Butyl Titanate (wt %) | 1 | 1 | 1 |
| Initial Adhesion (oz/in) | 72 | 68 | 64 |
| Cured Adhesion | | | |
| oz/in | 112 | 112 | 100 |
| days cured | 7 | 7 | 7 |

What is claimed is:

1. A pressure sensitive adhesive composition produced by thermally curing a composition comprising:

(A) 50 to 80 parts of a benzene soluble, capped, organopolysiloxane resin consisting essentially of $R_3SiO_{1/2}$ siloxane units and $SiO_{4/2}$ siloxane units, wherein R is selected from the group consisting of alkyl radicals having 1 to 10 carbon atoms and aryl radicals having from 6 to 10 carbon atoms; there being from 0.5 to 1.5 $R_3SiO_{1/2}$ units for every $SiO_{4/2}$ units and containing less than 1 weight percent silicon-bonded hydroxyl groups based on the total weight of (A), (B) 20 to 50 parts of an alkenyl functional polydiorganosiloxane polymer having the general formula $R^1_2R^2SiO(R^2_2SiO)_nSiR^2R^1_2$ wherein each $R^1$ individually is a radical selected from the group consisting of methyl, ethyl, propyl and phenyl, each $R^2$ individually is selected from the group consisting of an alkenyl radical and $R^1$, as defined above, with the proviso that at least two $R^2$ radicals per molecule must be alkenyl; and n has a value such that the viscosity of (B) is from 100,000 centipoise to 10,000,000 centipoise at 25° C., the amount of (A) and (B) being 100 parts;

(C) a organohydrogenpolysiloxane compound having an average of at least 3 silicon-bonded hydrogen atoms per molecule; the amount of (C) present being sufficient to provide from 1 to 30 silicon bonded hydrogen atoms for every olefinically unsaturated radical in the total of (A) plus (B), (D) 0.5 to 10 parts per 100 parts of (A) and (B) of an alkenetrialkoxysilane having the general formula $R^3Si(OR^4)_3$ wherein $R^3$ is an alkenyl group and $R^4$ is an alkyl group having from 1 to 4 carbon atoms;

(E) a platinum containing catalyst in sufficient quantity to provide at least 0.1 to 1,000 parts of platinum for every one million parts of (A) through (D), and (F) 0.5 to 10 parts per 100 parts of (A) and (B) of a moisture curing catalyst in an amount suitable to promote a moisture-initiated reaction of the alkoxy radicals of (D)

wherein said pressure sensitive adhesive is capable of further curing in the presence of moisture.

2. The composition as claimed in claim 1 wherein component (A) consists essentially of $(CH_3)_3SiO_{1/2}$ siloxane units and $SiO_{4/2}$ siloxane units.

3. The composition as claimed in claim 1 wherein in component (A) the ratio of $R_3SiO_{1/2}$ units to every $SiO_{4/2}$ units is from 0.5 to 1.0.

4. The composition as claimed in claim 1 wherein in component (A) the ratio of $R_3SiO_{1/2}$ units to every $SiO_{4/2}$ units is from 1.1 to 1.5.

5. The composition as claimed in claim 1 wherein the resin contains less than 0.6 wt percent silicon-bonded hydroxyl groups based on the total weight of (A).

6. The composition as claimed in claim 1 wherein component (B) has a viscosity of from 1,000,000 to 10,000,000 centipoise at 25° C.

7. The composition as claimed in claim 1 wherein in component (B) at least 90% of all $R^1$ radicals are methyl.

8. A composition as claimed in claim 1 wherein the organohydrogenpolysiloxane (C) is a dimethyl-methylhydrogenpolysiloxane copolymer.

9. A composition as claimed in claim 8 wherein the dimethyl-methylhydrogenpolysiloxane copolymer is a linear dimethyl-methylhydrogenpolysiloxane copolymer.

10. A composition as claimed in claim 1 wherein component (D) is a vinyltrialkoxysilane.

11. A composition as claimed in claim 10 wherein the vinyltrialkoxysilane is vinyltrimethoxysilane.

12. A composition as claimed in claim 1 wherein the platinum containing catalyst (E) is a chloroplatinic acid-vinylsiloxane complex.

13. A composition as claimed in claim 1 wherein component (F) is dibutyltin dilaurate.

14. A composition as claimed in claim 1 further comprising a platinum catalyst inhibitor.

* * * * *